US009702628B2

(12) United States Patent
Chen et al.

(10) Patent No.: US 9,702,628 B2
(45) Date of Patent: Jul. 11, 2017

(54) REFRACTORY WALLS, AND GASIFICATION DEVICES AND METHODS

(75) Inventors: Wei Chen, Pudong (CN); Honghai Dong, Pudong (CN); Zhaohui Yang, Pudong (CN); Minggang She, Pudong (CN); Lishun Hu, Pudong (CN); Ke Liu, Irvine, CA (US); Xianglong Zhao, Pudong (CN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1071 days.

(21) Appl. No.: 13/037,968

(22) Filed: Mar. 1, 2011

(65) Prior Publication Data

US 2012/0222354 A1 Sep. 6, 2012

(30) Foreign Application Priority Data

Mar. 29, 2010 (CN) .......................... 2010 1 0137013

(51) Int. Cl.

*B01J 7/00* (2006.01)
*F27D 1/00* (2006.01)
*C10J 3/48* (2006.01)
*C10J 3/74* (2006.01)
*C10J 3/52* (2006.01)
*C10J 3/76* (2006.01)
*C10J 3/84* (2006.01)

(52) U.S. Cl.

CPC ............ *F27D 1/0006* (2013.01); *C10J 3/485* (2013.01); *C10J 3/526* (2013.01); *C10J 3/74* (2013.01); *C10J 3/76* (2013.01); *C10J 3/845* (2013.01); *C10J 2300/093* (2013.01); *C10J 2300/0959* (2013.01)

(58) Field of Classification Search

CPC ..................................................... F27D 1/0006
USPC ..... 48/127.1, 127.9, 197 R, 76, 67, 69, 200, 48/71–73, 61
See application file for complete search history.

(56) References Cited

U.S. PATENT DOCUMENTS

| | | | | |
|---|---|---|---|---|
| 2,686,666 | A * | 8/1954 | Tau | 266/190 |
| 3,652,070 | A * | 3/1972 | Sagara | 266/46 |
| 3,984,089 | A | 10/1976 | Van Laar et al. | |
| 4,062,656 | A * | 12/1977 | Blaser | B01J 8/1818 110/245 |
| 4,437,415 | A * | 3/1984 | Spielman | 110/182.5 |

(Continued)

FOREIGN PATENT DOCUMENTS

| | | | |
|---|---|---|---|
| CA | WO 2008104088 A1 * | 9/2008 | C10J 3/20 |
| CN | 1074525 A | 7/1993 | |

(Continued)

OTHER PUBLICATIONS

CN Office Action dated Feb. 4, 2013 from corresponding CN Application No. 201010137013.5.

(Continued)

*Primary Examiner* — Imran Akram
(74) *Attorney, Agent, or Firm* — GE Global Patent Operation; Peter T. DiMauro

(57) ABSTRACT

A refractory wall comprises a hotface layer comprising a hotface surface configured to be adjacent to a carbonaceous gasification environment, a backing layer facing the hotface layer, and a cooling layer facing the backing layer and configured to cool the hotface layer via the backing layer. A gasification device and a gasification process are also presented.

15 Claims, 2 Drawing Sheets

(56) References Cited

U.S. PATENT DOCUMENTS

| | | | | |
|---|---|---|---|---|
| 5,133,267 | A | 7/1992 | Kent et al. | |
| 5,741,349 | A | 4/1998 | Hubble et al. | |
| 6,234,790 | B1 | 5/2001 | Van Laar et al. | |
| 8,052,864 | B2 * | 11/2011 | Eilers et al. | 208/86 |
| 8,100,992 | B2 | 1/2012 | Sakai et al. | |
| 2001/0020346 | A1 * | 9/2001 | Schingnitz et al. | 48/127.9 |
| 2006/0150773 | A1 * | 7/2006 | Iwasaki et al. | 75/503 |
| 2010/0040778 | A1 * | 2/2010 | Shuba et al. | 427/230 |
| 2011/0062013 | A1 * | 3/2011 | Tsangaris | F23G 5/0276 202/209 |
| 2011/0116987 | A1 | 5/2011 | Schulze et al. | |
| 2012/0097516 | A1 * | 4/2012 | Seiler | C10J 3/485 201/1 |
| 2012/0222354 | A1 | 9/2012 | Chen et al. | |

FOREIGN PATENT DOCUMENTS

| | | | |
|---|---|---|---|
| CN | 2576717 | Y | 10/2003 |
| CN | 1624085 | A | 6/2005 |
| CN | 2713318 | Y | 7/2005 |
| CN | 101220299 | A | 7/2008 |
| DE | 3009850 | A1 | 9/1981 |
| JP | 10140166 | A | 5/1998 |
| JP | 11035949 | A | 2/1999 |
| NO | 2008050727 | A1 | 5/2008 |
| WO | 0137984 | A1 | 5/2001 |
| WO | 2009129990 | A2 | 10/2009 |

OTHER PUBLICATIONS

Unofficial English Translation of Chinese Office Action issued in connection with corresponding CN Application No. 201010137013.5 on Oct. 15, 2013.

Office Action issued in connection with corresponding KR Application No. 1020110027475 dated on Jan. 12, 2017.

Canadian Office Action issued in connection with corresponding CA Application No. 2733712 on Oct. 18, 2016.

* cited by examiner

REFRACTORY WALLS, AND GASIFICATION DEVICES AND METHODS

BACKGROUND

This invention relates generally to refractory walls, and gasification devices and methods employing the refractory walls. More particularly, the invention relates to refractory walls and slagging gasification devices and methods employing the refractory walls.

Gasification devices, such as gasifiers, are generally used for gasification of carbonaceous fuels, such as coal, to produce mixtures of hydrogen and carbon monoxide, such as coal gas or synthesis gas. The gasification of coal and other carbon-containing materials produces energy more efficiently and with less environmental impact than some conventional combustion-based processes.

The principle of the gasification of carbonaceous fuels consists in controlled partial combustion under pressures approximately from 1 atmosphere to 200 atmospheres and in a steam or oxygen atmosphere at a temperature approximately from 800° C. to 2000° C. For the coal gasification, the reliability of gasification devices in such severe operation conditions generally depends on the service life and performance of refractory walls used to maintain the gasification.

In some gasification devices, molten or liquid slag is formed during the gasification process. The slag is a corrosive agent that penetrates the refractory walls so as to shorten the service life of the refractory walls. As a result, such gasification devices have to be periodically shut down for replacement of the refractory walls, which reduces the productivity and increases the cost for the carbonaceous gasification.

Therefore, there is a need for new and improved refractory walls and slagging gasification devices and methods employing refractory walls.

BRIEF DESCRIPTION

A refractory wall is provided in accordance with one embodiment of the invention. The refractory wall comprises a hotface layer comprising a hotface surface configured to be adjacent to a carbonaceous gasification environment, a backing layer facing the hotface layer, and a cooling layer facing the backing layer and configured to cool the hotface layer via the backing layer.

A gasification device for gasification of one or more carbonaceous fuels is provided in accordance with another embodiment of the invention. The gasification device comprises a gasifying apparatus comprising a refractory wall defining a gasification chamber for the gasification. At least a part of the refractory wall comprises a hotface layer comprising a hotface surface configured to define the gasification chamber, a backing layer around the hotface layer, and a cooling layer around the backing layer and configured to cool the hotface layer via the backing layer. The at least a part of the refractory wall further comprises a compressible layer around the cooling layer and a shield around the compressible layer.

Another aspect of the invention further comprises a gasification process that comprises introducing one or more carbonaceous fuels and one or more oxidizing streams into a gasifying apparatus. The gasifying apparatus comprises a refractory wall defining a gasification chamber for the gasification with at least a part of the refractory wall comprising a hotface layer configured to define the gasification chamber, a backing layer around the hotface layer, and a cooling layer around the backing layer. The at least a part of the refractory wall further comprises a compressible layer around the cooling layer. The coal gasification process further comprises gasifying the one or more carbonaceous fuels in the gasifying apparatus to produce at least syngas and slag, and cooling the hotface layer via, the backing layer by the cooling layer so that a portion of the slag deposits on at least a part of the hotface layer.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION OF THE INVENTION

Embodiments of the present disclosure are described herein with reference to the accompanying drawings. In the subsequent description, well-known functions or constructions are not described in detail to avoid obscuring the disclosure in unnecessary detail. As used herein "facing" and "around" are not intended to preclude the possibility of additional intermediate layers being present to the extent such layers do not interfere with the functionality of the structural and cooling aspects of the present invention.

Figure 1:
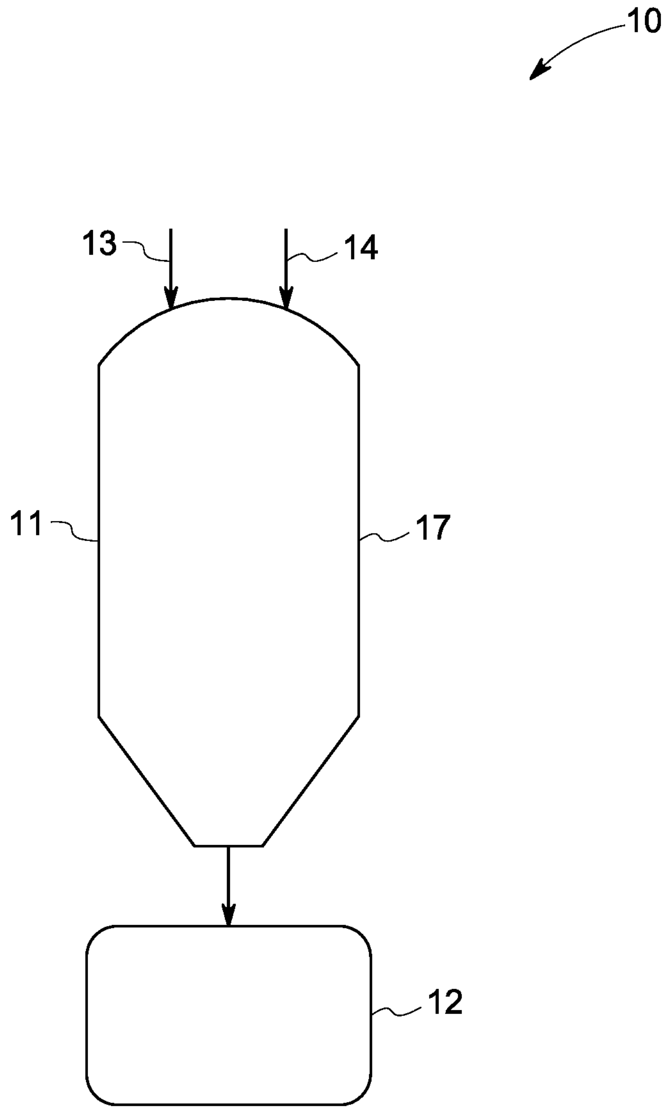
FIG. 1 is a schematic diagram of a gasification device in accordance with one embodiment of the invention.

FIG. 1 illustrates a schematic diagram of a gasification device 10 for gasification of carbonaceous fuels, such as coal in accordance with one embodiment of the invention. It should be noted that the gasification device 10 is not limited to any particular gasification device. In some non-limiting embodiments, the gasification device 10 may comprise a gasifier and produce slag during operation, and in these embodiments, the gasifier is typically referred to as a slagging gasifier. In a non-limiting example, the slagging gasifier may comprise an entrained flow gasifier, which removes a part of the ash as slag, for example, when the operating temperature is higher than the ash fusion temperature. In an entrained flow gasifier, a fraction of the ash is produced as fine dry fly ash and/or as black colored fly ash slurry.

As illustrated in FIG. 1, the gasification device 10 comprises a gasifying apparatus 11. In some embodiments, the gasifying apparatus 11 is configured to gasify carbonaceous fuels, such as coal. In non-limiting examples, the gasifying apparatus 11 may comprise a slagging gasifier and have a cylindrical shape with substantially conical or convex upper and lower ends (not labeled).

Additionally, in some examples, the gasification device 10 further comprises a cooling apparatus 12 disposed downstream from the gasifying apparatus 11. In the illustrated example, the cooling apparatus 12 is in fluid communication with the lower end of the gasifying apparatus 11 to receive and cool outputs, such as slag and/or syngas from the gasifying apparatus 11. In non-limiting examples, the cooling apparatus 12 may have a cylindrical shape and may include a radiation syngas cooler (RSC) or a cooler with a slag bath, for example.

Figure 2:
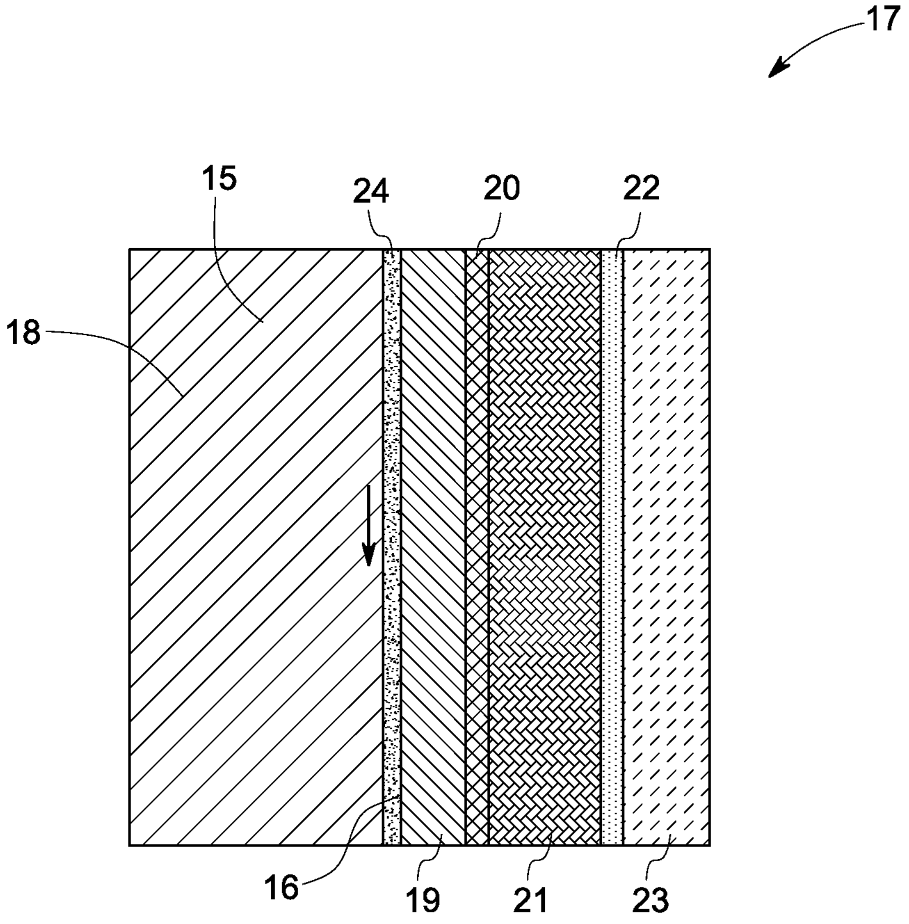
FIG. 2 is a schematic cross sectional view of a refractory wall of the gasification device shown in FIG. 1.

For the illustrated arrangement, during operation, carbonaceous fuels 13 and one or more oxidizing streams 14 are introduced into the gasifying apparatus 11 from the upper end thereof to perform the gasification process to produce the syngas (not shown) with a by-product of slag 15 (shown in FIG. 2). The syngas is then delivered into the cooling apparatus 12 for subsequent processes, such as purification in a scrubbing tower (not shown). Meanwhile, the slag 15 flows downwardly along a hotface surface 16 (shown in FIG. 2) of a refractory wall 17 of the gasifying apparatus 11 and enters into the cooling apparatus 12 for cooling. In some examples, the carbonaceous fuels 13 may comprise solid and liquid carbonaceous fuels. Non-limiting examples of the solid carbonaceous fuels include coal, such as pulverized coal, or other solid carbon-containing materials. In one example, the oxidizing stream 14 includes oxygen.

It should be noted that the arrangement of the gasification device 10 is merely illustrative. In some examples, the gasifying apparatus 11 and the cooling apparatus 12 may be separate units, as shown, and in other examples, the gasifying apparatus 11 and the cooling apparatus 12 may be integrated into a unitary structure. In some applications, the carbonaceous fuels 13 and/or the oxidizing stream 14 may be introduced into the gasifying apparatus 11 from the lower end thereof. In certain applications, the cooling apparatus 12 may not be employed and the syngas may be introduced into a next reactor, such as a fixed-bed reactor for further treatment.

FIG. 2 is a schematic cross sectional view of the refractory wall 17 of the gasifying apparatus 11. It should be noted that the arrangements in FIG. 2 is merely illustrative. In some examples, the refractory wall 17 may be used for at least a part of the gasifying apparatus 11. Additionally, the refractory wall 17 may also be used for at least a part of the cooling apparatus 12.

As illustrated in FIG. 2, the refractory wall 17, in one embodiment, comprises a hotface layer 19, a backing layer 20, a cooling layer 21, a compressible layer 22, and a shield 23. In certain examples, one or more additional intermediate layers may or may not be employed between two adjacent layers. The hotface layer 19 defines a gasification chamber 18 for performing the gasification and comprises the hotface surface 16, which is directly exposed to or adjacent to the combustion chamber 18 in which the gasification process occurs in the gasifying apparatus 11. In non-limiting examples, the hotface layer 19 may comprise hotface bricks, also referred to be as refractory bricks. In non-limiting examples, the term "hotface", as used herein, may indicate a layer or a surface is resistant to a certain high temperature.

The backing layer 20 is disposed around and configured to back the hotface layer 19 so as to improve the mechanical strength of the refractory wall 17. In some embodiments, the hotface layer 19 and/or the backing layer 20 may comprise one or more refractory materials. Non-limiting examples of the one or more refractory materials may be selected from the group consisting of ceramics, silicon carbide, silicon nitride, alumina ($Al_2O_3$), zirconia ($ZrO_2$), silica ($SiO_2$), magnesia (MgO), chromium-containing materials including chromia ($Cr_2O_3$), and combinations thereof. In some examples, bricks used in the hotface layer 19 may comprise one or more chromium-containing materials, such as ZIRCHROM90™ and ZIRCHROM60™ ceramics produced by Saint-Gobain Industrial Ceramics. The backing layer 20 may also comprise one or more chromium-containing materials, such as CHROMCOR12™ ceramics produced by Saint-Gobain Industrial Ceramics.

In some non-limiting examples, the hotface layer 19 may comprise refractory bricks with some extending outward into a first pattern. The backing layer 20 may have a second pattern of extending bricks, which is aligned so that the extending bricks of the backing layer 20 may be inserted into open areas of the hotface layer 19.

The cooling layer 21 is disposed around the backing layer 20 so as to be positioned between the backing layer 20 and the compressible layer 22 to cool the hotface layer 19 and the backing layer 20. Thus, during gasification, the temperatures of the hotface layer 19 and the backing layer 20 may be reduced to offset the effect of the high temperatures in the gasification process so as to increase the service life and performance thereof. In some examples, the cooling layer 21 may employ one or more coolants, such as water and oil for removing the heat from the hotface layer 19 and the backing layer 20. In one non-limiting example, the cooling layer 21 comprises one or more tubes with water circulating therein for cooling the refractory bricks 19 and the backing layer 20.

In some embodiments, the compressible layer 22 is located between the cooling layer 21 and the shield 23 for thermal insulation and buffering of the thermal expansion of the hotface layer 19, the backing layer 20 and/or the cooling layer 21. In some examples, the compressible layer 22 may be resistant to high temperatures and comprise one or more refractory organic materials. In one non-limiting example, the one or more refractory organic materials include one or more ceramic fiber materials or other suitable materials. The shield 23 is disposed outside of the compressible layer 22 to reinforce the mechanical integrity of the gasification device 10 and sustain the pressure differences between the inside and the outside of the gasification device 10. In some examples, the shield 23 may comprise one or more metal materials, such as stainless steel. In certain applications, the compressible layer 22 and/or the shield 23 may not be employed.

Accordingly, as depicted in FIG. 2, during operation, the carbonaceous fuels are introduced into and gasified in the gasifying apparatus 11 (shown in FIG. 1) at high temperatures and under high pressures, so that the syngas, the slag 15 and/or other materials may be produced. The slag 15 flows downwardly towards the cooling apparatus 12 (shown in FIG. 1) along the hotface surface 16 of the hotface layer 19. Non-limiting examples of the slag 15 may comprise silica ($SiO_2$), Ferrous Oxide (FeO), iron oxide ($Fe_2O_3$), Calcium oxide (CaO), alumina ($Al_2O_3$) and other materials derived from materials feeding into the gasifying apparatus 11.

Meanwhile, the cooling layer 21 cools the hotface layer 19 via cooling the backing layer 20. Due to the cooling of the cooling layer 21, a portion of the slag 15 solidifies or becomes viscous so as to deposit on the hotface surface 16 of the hotface layer 19. As a result, the deposited slag layer 24 on the hotface layer 19 prevents other fluid slag from corroding the refractory wall 17. In certain examples, the step of cooling the hotface layer 19 and the step of gasifying the fuels may be performed simultaneously.

Thus, the refractory wall 17 may be protected in presence of deposited slag layer 24. In some applications, the deposited slag layer 24 may be formed as a portion of the refractory wall 17 and act as a hotface layer, in a similar manner as the hotface layer 19 for subsequent gasification processes. Additionally, as described before, the cooling layer 21 may reduce the temperatures of the hotface layer 19 and the backing layer 20 so that the refractory wall 17 may also be protected from corrosion of the high temperatures.

In embodiments of the invention, the cooling layer 21 may reduce the temperature of the refractory wall 17 and facilitate the deposition of the slag layer 24 on the refractory wall 17. Thus, the service life and the performance of the gasification device 10 may be increased to enhance the productivity thereof, Additionally, in certain applications, the arrangements of the refractory wall 17 may be used to retrofit conventional gasifiers to improve their performances.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be through the spirit and scope of the disclosure as defined by the subsequent claims.

What is claimed is:

1. A refractory wall comprising:

a refractory hotface layer comprising a hotface surface configured to be adjacent to a carbonaceous gasification environment;

a backing layer facing and disposed around the refractory hotface layer to improve the mechanical strength of the refractory hotface layer, wherein the refractory hotface layer and the backing layer comprise chromium-containing materials;

a cooling layer facing the backing layer and positioned between the backing layer and a compressible layer, the cooling layer configured to cool the refractory hotface layer via the backing layer;

the compressible layer facing and disposed around the cooling layer and configured to provide buffer for thermal expansion of the refractory hotface layer, the backing layer, and the cooling layer; and a slag layer deposited on at least a part of the hotface surface of the refractory hotface layer.

2. The refractory wall of claim 1, further comprising a metal shield facing and disposed around the compressible layer.

3. The refractory wall of claim 1, wherein the cooling layer comprises one or more tubes for circulating cooling fluid to cool the refractory hotface layer.

4. A gasification device for gasification of one or more carbonaceous fuels, comprising a gasifying apparatus comprising a refractory wall defining a gasification chamber for the gasification, at least a part of the refractory wall comprising:

a hotface layer comprising a hotface surface configured to define the gasification chamber, a backing layer around the hotface layer, wherein the hotface layer and the backing layer comprise chromium-containing materials, a cooling layer around the backing layer and positioned between the backing layer and a compressible layer, the cooling layer configured to cool the hotface layer via the backing layer, the compressible layer around the cooling layer and configured to provide buffer for thermal expansion of the hotface layer, the backing layer, and the cooling layer, and a shield around the compressible layer.

5. The gasification device of claim 4, further comprising a cooling apparatus disposed downstream from and in fluid communication with the gasifying apparatus.

6. The gasification device of claim 5, wherein the cooling apparatus comprises one of a radiation syngas cooler and a cooler with a slag bath.

7. The gasification device of claim 4, wherein the gasification device comprises a slagging gasifier.

8. The gasification device of claim 4, wherein the at least a part of the refractory wall further comprises a slag layer deposited on at least a part of the hotface surface of the hotface layer.

9. The gasification device of claim 8, wherein the slag layer comprises one or more of silica ($SiO_2$), Ferrous Oxide (FeO), iron oxide ($Fe_2O_3$), Calcium oxide (CaO), and alumina ($Al_2O_3$).

10. The gasification device of claim 4, wherein the cooling layer comprises one or more tubes for circulating cooling fluid to cool the hotface layer.

11. The gasification device of claim 4, wherein the compressible layer comprises ceramic fiber materials.

12. A gasification process comprising:

introducing one or more carbonaceous fuels and one or more oxidizing streams into a gasifying apparatus, the gasifying apparatus comprising a refractory wall defining a gasification chamber for the gasification with at least a part of the refractory wall comprising:

a hotface layer configured to define the gasification chamber, a backing layer around the hotface layer, wherein the hotface layer and the backing layer comprise chromium-containing materials, a cooling layer around the backing layer and positioned between the backing layer and a compressible layer, the cooling layer configured to cool the hotface layer via the backing layer, and the compressible layer around the cooling layer and configured to provide buffer for thermal expansion of the hotface layer, the backing layer, and the cooling layer;

gasifying the one or more carbonaceous fuels in the gasifying apparatus to at least produce syngas and slag; and cooling the hotface layer via the backing layer by the cooling layer so that a portion of the slag deposits on at least a part of the hotface layer.

13. The gasification process of claim 12, wherein the gasifying apparatus comprises a slagging gasifier.

14. The gasification process of claim 12, further comprising introducing the syngas and the slag into a cooling apparatus for cooling.

15. The gasification process of claim 12, wherein the cooling layer comprises one or more tubes for circulating cooling fluid to cool the hotface layer.

* * * * *